Figure 1:
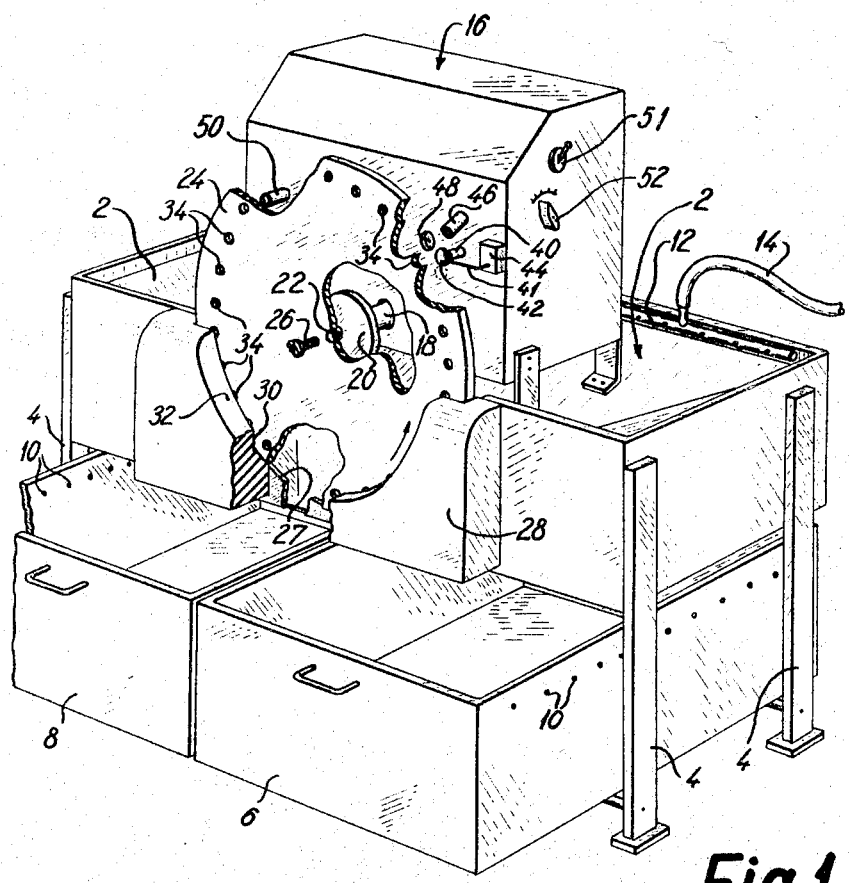

Jan. 10, 1967  G. B. JENSEN ETAL  3,297,157
FISH EGG SORTING

Filed Feb. 9, 1965  3 Sheets-Sheet 2

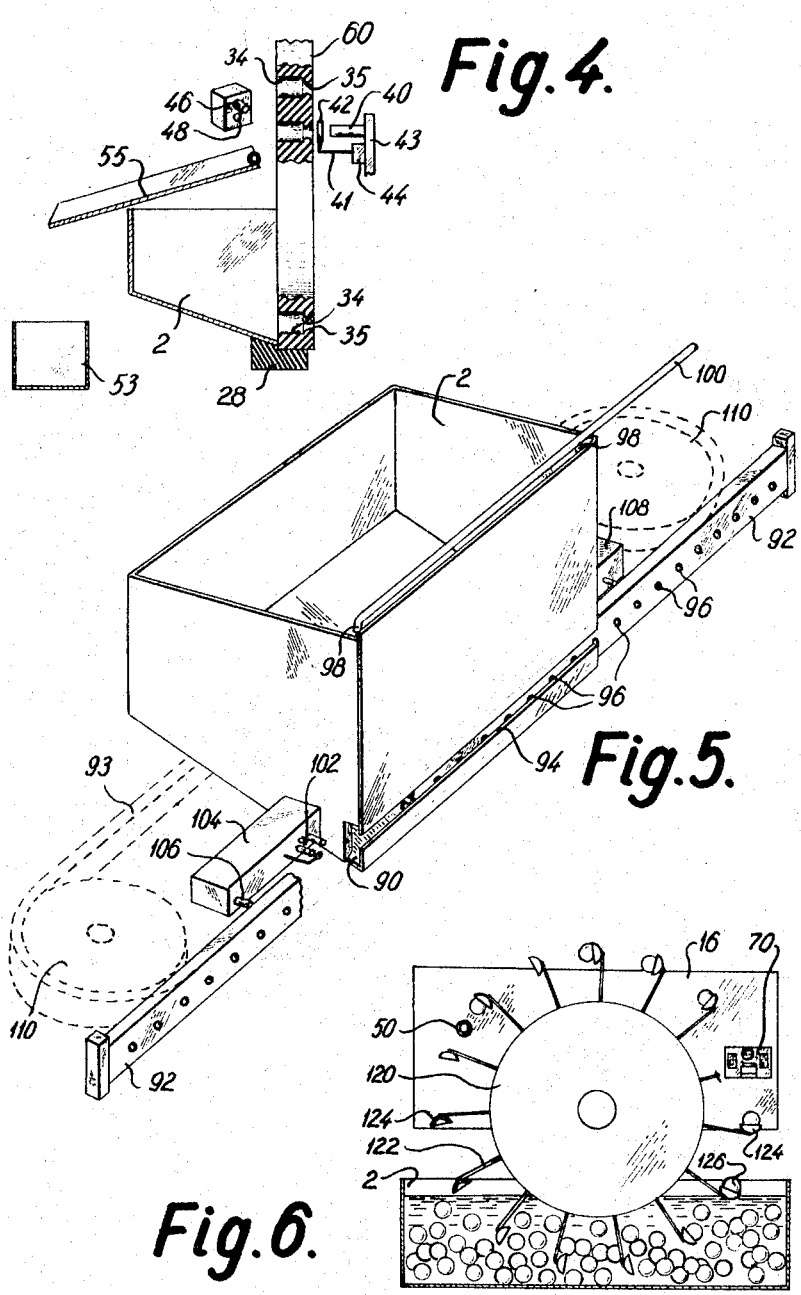

United States Patent Office 3,297,157
Patented Jan. 10, 1967

3,297,157
FISH EGG SORTING
Gunnar Borgbjerg Jensen, Hasselager, and Arden Donald Winther, Dorup pr. Horning, Denmark
Filed Feb. 9, 1965, Ser. No. 431,362
Claims priority, application Great Britain, Feb. 11, 1964, 5,592/64
8 Claims. (Cl. 209—73)

The present invention relates to a method and a machine for separating or sorting fish eggs and is particularly concerned with the separation of dead eggs from a quantity of fish eggs.

In piscicultural pond farming it is necessary at certain times to sort out the dead fish eggs from the living eggs since the presence of dead eggs in the hatching ponds is most disadvantageous. Hitherto, this sorting has been carried out manually, based on the characteristics appearance of the dead eggs which have a milky colour while the living eggs are colourless and transculent. For sorting out the dead eggs from a mixture of dead and living eggs in water it has been common practice to use a pipette like instrument with which the operator catches and lifts the dead eggs one by one out from the mixture. Even in smaller pond farms there may be several millions of fish eggs to be sorted in this manner, so that the sorting has been most expensive.

The object of the invention is to provide a method enabling the sorting work to be carried out at extremely increased speed.

A further object of the invention is to provide a method enabling the sorting to be carried out in a sorting station where the eggs are situated in a well defined pattern rather than in the complete disorder in the mixture, so that automatic or semiautomatic sorting means may be brought in use.

A further object of the invention is to provide an egg sorting machine capable of sorting a mixture of dead and living eggs at very high speed and which is simple in construction and reliable in operation.

Figure 2:
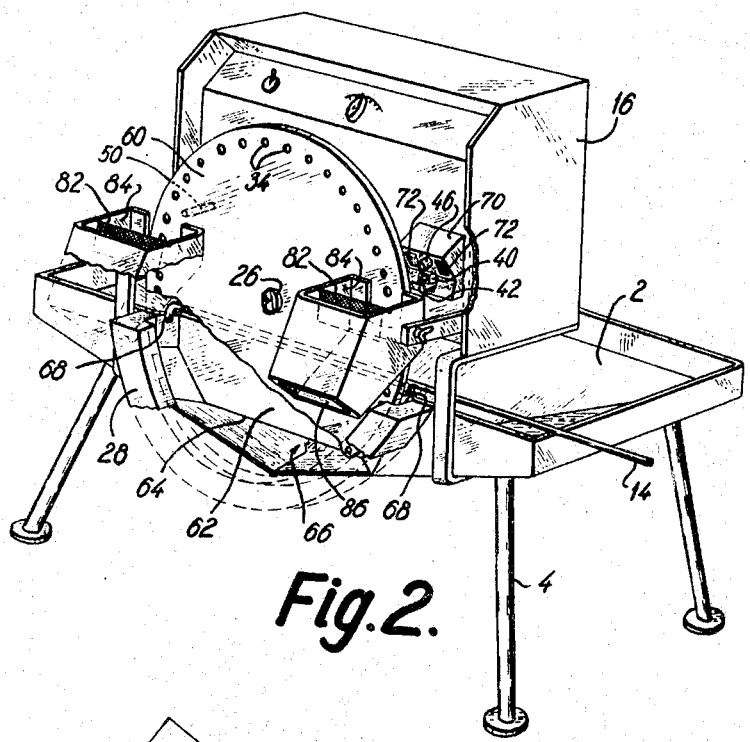
Figure 3:
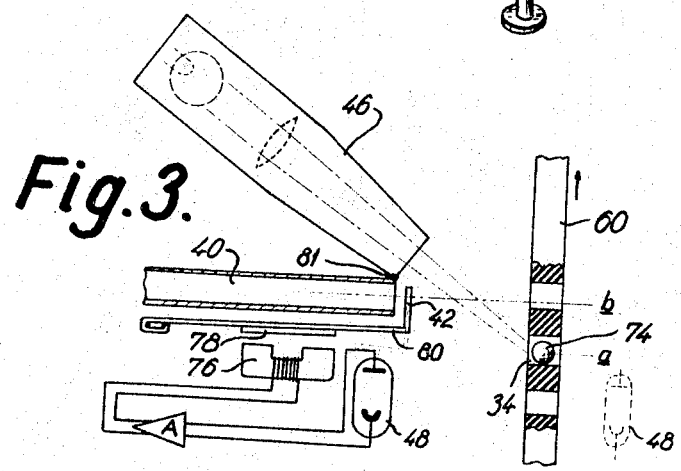

The invention will now be described in more detail, reference being made to the drawing, in which:

FIG. 1 is a perspective view, partly in section, of one embodiment of a machine according to the invention, FIG. 2 is a corresponding view of another embodiment of the machine, FIG. 3 is a schematic sectional view illustrating the function of the sorting means of the machine shown in FIG. 2, FIG. 4 is a sectional view of a modified detail of the machine, FIG. 5 is a perspective view of a third embodiment of a machine according to the invention, and FIG. 6 is a front elevation of a fourth embodiment of a machine according to the invention.

The machines shown in the drawing generally comprise a container for a quantity of fish eggs in a suitable medium such as water, a movable egg receiving member having a plurality of apertures or similar means each dimensioned for receiving one and only one egg, means for providing a flow of said medium against or through said apertures to thereby bring an egg into each aperture, means for moving said receiving member so as to bring said apertures from the egg receiving position to a position outside said container, means for testing the character of each egg in each aperture at a stage of this movement and for producing a control signal when testing an egg of a first character, rejector means operatively connected with said testing means and operable by said control signal to move the tested egg from its aperture to first collecting means for eggs of said first character, and means for moving eggs of a second character subsequently remaining in their apertures to second collecting means.

For facilitating the use of automatic sorting means the said testing means and said rejector means are preferably located in the air. It is in practice impossible to separate the eggs in some pattern when they are exposed to air, since in this condition they are sticky and form a coherent mass from which it is most difficult to isolate single eggs by sufficiently gentle means. According to the invention, however, the isolation of single eggs from the mass is carried out in water, where the eggs are non-sticky and act as individual particles.

More specifically, the machine shown in FIG. 1 comprises a tray 2 supported by four legs 4. Below the tray 2 there is arranged two drawers 6, 8, each having a row of small holes 10 near their top edges. The bottom of the tray 2 is inclined from all sides against the middle front portion thereof. At the rear side of the tray 2 there is mounted a perforated water pipe 12 having a water supply tube 14.

Mounted on the bottom of the tray 2 and spaced thereabove is provided a box 16 containing an electric motor (not shown) having a driving shaft 18 extending through a note in the front side of the box and provided at the end with a flange 20 in the middle of which there is a screw threaded hole 22. A disc 24 is secured to the flange 20 by means of a finger screw 26 in the holes 22. The front edge portion of the lower part of the disc 24 slides against a surface portion 30 of a rigidly secured front block 28, the top side 32 of which has a curvature concentric with the disc 24. The front side of the tray 2 behind tthe disc 24 also has a concentric curvature with the edge 27 thereof situated nearer to the periphery of the disc 24.

A small distance from the periphery of the disc 24 there is provided a ring of small holes 34 and the top side 32 of the block 28 is so situated that only a small portion of these holes are exposed above the contacting surface 30. It will be understood that the lower part of the disc 24 in any angular position of the disc will constitute a front wall portion for the tray 2 with small passageways formed by the innermost portions of the holes 34.

The tray 2 is adapted to contain a quantity of fish eggs in water, and fresh water is continuously supplied through the tube 14 and the distributor pipe 12. The water will leave the tray through the holes 34 in the lower portion of the disc 24 and by this water flow through the holes the fish eggs will be influenced to enter the holes from the interior side and will remain in the holes since the opening thereof left by the contacting surface 28 is smaller than the eggs. Furthermore, the holes are so adapted that they can contain one but not more than one fish egg of the type being sorted. As the disc 24 is rotating all holes are almost sure to receive an egg during the entire movement in submerged condition. The eggs in the holes passing up from the water will remain safely in the holes since they will stick thereto as soon as no water is present to eliminate the stickness.

At the box 16 there is mounted a blower nozzle 40 directed against the row of holes 34. A retractable shield member 42 for the jet is mounted on a swing arm 44 between the nozzle mouth and the disc 24 and is adapted to be moved to and from the jet breaking position by means of a control unit 44. A spot light member 46 is directed against the same point in the row of holes and is adapted to continuously produce a light signal on the fish eggs moving past this point. A photo cell 48 is arranged so as to receive a part of the light reflection from the area lit up by the spot light 46.

At the other side of the box 16 there is arranged a blower nozzle 50 also directed against the row of holes and adapted to continuously produce a jet thereagainst, blower means (not shown) being provided in the box 16 for supplying air to the nozzles 40 and 50.

It will be understood that as long as the jet stop member 42 is breaking the jet from the nozzle 40 the fish eggs received in the holes 34 will be blown out therefrom as they in turn pass the nozzle 50, and the drawer 8 is so situated that it is able to collect these eggs when they are blown out at this place. If necessary a cover screen (not shown) may be mounted to ensure that the eggs are not blown outside the drawer 8. When the holes are blown free they will again receive an egg during the further rotation of the disc 24 down through the water. The drawer 8 will also receive a part of the water leaving the tray 2 through the uncovered portions of the lower holes 34. The holes 10 in the drawer 8 act as overrun openings for the water and are of smaller diameter than the fish eggs so that no eggs may escape therethrough. It will be seen that in this manner the eggs in the drawer 8 will be kept in fresh, circulating water, i.e. under optimal conditions.

The control box 44 is connected with the photo cell 48 through suitable amplifier means inclined in the box 16 in such a manner that a signal from the photo cell may cause the stop member 42 to be retracted from the jet whereby the blower nozzle 40 is unable to perform the same blowing action as already described with reference to the blowing nozzle 50. In a similar manner the eggs will fall down into the drawer 6 when blown out from the holes 34 by the nozzle 40.

In a preferred embodiment of the invention the control unit 44 is adapted to cause the removal of the stop member 42 from the jet in response to increased light intensity on the photo cell 48. In this embodiment the disc 24 is of dull, dark colour so as to cause very little reflection of the light from the spot light 46. As already mentioned, the living fish eggs are colourless and tranculent so that neither these will cause any considerable reflection of the light. However, when a dead egg of milky colour enters the light spot the light will be reflected sufficiently to produce a signal from the photo cell 48 so as to thereby activate the control unit 44 with the consequence that the air stop plate 42 is moved away from the nozzle 40 almost instantaneously. The dead egg, therefore, will immediately be blown out from its hole 34 and down into the drawer 6, in which all the dead eggs will be collected. As soon as the dead egg has passed the test point the signal on the photo cell 48 will cease when the light hits the plate 24 so that the control unit 44 will again bring the stop plate 42 to its initial position, from which it is ready to be moved away as soon as the next dead egg appears. All the living eggs pass this arrangement and are subsequently blown out by the nozzle 50.

At the box 16 there is provided a switch 51 for the driving motor for disc 24 and the blower means as well as a regulation button 52 for adjusting the sensibility of the amplifier between the photo cell 48 and the control box 44. In this manner the amplifier may be adjusted to the right performance dependant of the general light intensity in the surroundings and of the desired degree of fine or coarse sorting.

In case of fish eggs of another size the disc 24 may be easily replaced by another disc in which the holes 34 are adapted to the different egg size.

The machine shown in FIG. 2 is principally corresponding to that of FIG. 1, so that just a few different features shall be described:

Behind the rotating disc, here designated with 60, there provided a rigid front wall portion 62 of the tray 2. This wall portion is somewhat spaced from the rear side of the disc and has a horizontal lower edge 64 leaving therebelow an opening 66 above the inwardly and downwardly inclined front bottom portion of the tray 2. The contents of the tray 2 may pass through this opening 66 to the rear side of the disc 60 where an outflow of water may take place through the holes 34 exactly as in the first described embodiment. At each side of the room between the disc 60 and the wall portion 62 there is provided a water supply stub 68.

The restricted opening 66 serves to limit the number of eggs available immediately behind the disc so that the egg concentration at this place will not impede the free water flow through the uncovered parts of the holes 34 and thereby the safe introduction of an egg in each hole. When less concentrated the free eggs will also show decreased tendency to form a lump where the holes 34 are moved up from the water, whereby there is little risk of eggs sticking to the disc outside the holes, what could cause a faulty operation of the rejector means 40, 42. This phenomenon is further counteracted by the flow of supply water through the stub 68 at this place.

The spot light 46, the rejector nozzle 40, and the shield 42 are mounted in a common housing 70 in which also the photo cell 48 or rather more such cells connected in parallel are mounted behind glass windows 72. As shown in FIG. 3, in which a fish egg 74 is shown in a hole 34 in the disc 60 in a position designated with $a$, the spot light 46 is directed against the egg in this position, i.e. the egg is hit by the light beam when passing the position $a$ during its passage in upwards direction. The thickness of the disc 60 is small enough to ensure that the light will aways hit the egg despite the shown inclined position of the spot light. If the egg 74 is a living one it will cause no reflection of the light, but if it is a dead egg it will reflect the light to thereby increase the light intensity on the photo cell 48 which in its turn will produce an input signal on the amplifier A. The output from the amplifier, then, will activate a magnet 76 for pulling down an armature 78 secured to a resilient carrying arm 80 for the shield plate 42 so as to cause this plate to move down to the position shown in dotted lines in which the air from the nozzle 40 is free to be blown out against the disc 60. Even with a low inertia in the shield system 42, 80 the retraction thereof will take some time, and during this time the disc 60 has moved an angle corresponding to the egg 74 now passing the position $b$. This position, however, is in alignment with the nozzle 40 so that the egg will now be shown out from the hole 34. When the egg has passed the position $a$ the signal on the photo cell 48 will cease, but due to the inertia the shield system will not return to its closed position until the concerned hole 34 has just passed the position $b$. For enabling an adjustment of the position $a$ relatively to position $b$ in order to obtain a correct performance the spot light 46 is angularly adjustably supported in a hinge 81.

With the arrangement shown it has been possible to obtain a perfect performance with rather high continuous speed of the disc 60, for example corresponding to the sorting of 60–75 eggs per second.

The embodiment shown in FIG. 2 is provided with guiding shield members 84 mounted in front of each of the rejector nozzles 40 and 50 and having a lower outlet opening 86 and an interior stop member 82 for the eggs blown out from the holes 34 during passage of the nozzles. The stop members 82 preferably consist of freely hanging sheets of cloth or the like so as to be able to gently slow down the rejected eggs; these thereafter fall down through the outlet opening 86 into a suitable container such as a pail (not shown). These shields 84, 82 are preferably provided with means (not shown) for irrigating water over the egg guiding surfaces so as to counteract any sticking of the eggs thereto.

The rejection shields 84 and the water supply means 68 assembled in one construction unit (not shown) adapted to be easily removably secured to the front side of the machine so as to facilitate the cleaning of the entire machine. This unit may further be provided with water irrigation means for irrigating or sprinkling all surfaces, corners etc., where the eggs are likely to be deposited in sticky lumps.

In the embodiments described the nozzle shield 42 has assumed a normally-closed position. However, it may as well assume a normally-open position from which it is moved to the closed jet breaking position every time a dead egg is passing. In this case all the loving eggs will be rejected by the nozzle 40 whilst the dead eggs will be subsequently rejected by the nozzle 50.

The automatic control system may also be adapted to react on a decrease in the light intensity on the photo cell 48; when in this case the disc 24 or 60 is white or otherwise reflecting the nozzle shield 42 will remain in its position of rest as long as dead eggs only are passing the light spot, the reflection thus being constantly high. When a living egg passes the light spot the reflection decreases so as to cause the shield 42 to be moved to its opposite position. Also in this case the shield 42 may assume either a normally-closed or a normally-open position for the rejection of living or dead eggs respectively.

Furthermore, as indicated in dotted lines in FIG. 3, the photo cell 48 and the spot light 46 may be located at opposite sides of the disc 60 so that the function of the photo cell will be controlled by the light passing through—respectively not passing through—the eggs in the holes 34.

When the system is adapted to react at the passage of each living egg these eggs may be counted by means of a counter (not shown) operated by the signals from the amplifier A.

FIG. 4 is a sectional view of a part of the disc 60 in a modified embodiment in which the holes 34 are provided with a narrow portion 35 at that end thereof which is open to the front side of the disc. The portions 35 are sufficiently narrow to prevent the eggs from passing through the holes 34 so that in this case the wall portion 30 of the block member 28 in FIG. 1 may be avoided. For blowing out the eggs from the holes the blower nozzles 40 and 50 are mounted on supports 43 adjacent the front side of the disc and directed backwardly against the holes. The shield 42 and the control box 44 are also mounted on the support 43 and together with the nozzle 40 operatively connected with the amplifier means, respectively the blower means in the box 16 (not shown). The spot light 46 and the photo cell 48 are mounted adjacent to the rear side of the disc 60. Thus, the eggs will be blown out to the same side as that from which they entered the holes 34, and for guiding the sorted eggs to a container 53 there is provided a skid 55 being irrigated by water from a pipe 57.

The disc 24, 60 may be substituted by other means capable of moving egg receiving means through the water and past a sorting station; in FIG. 5 the tray 2 is provided with side slots 90 at each end of the lower front edge thereof. A rail member 92 extends through the opposite slots 90 along the lower front edge of the tray 2. In front of the rail member 92 there is provided a longitudinal slot 94 in the front side of the tray 2. The rail member 92 is provided with a row of holes 96 that are partially covered by the lower edge of the slot 94. The rail 92 is connected with driving means (not shown) for imparting thereto a reciprocal movement from side to side. The holes 96 located within the tray 2 will all receive one fish egg as the water flows out through the upper part of the holes, water being constantly supplied through studs 98 on a water pipe 100. When the rail 92 is reciprocated the holes 96 will bring the eggs outside the tray and past a sorting station 102 arranged in a side box 104 and exactly corresponding to the sorting station arranged in the housing 70 in FIG. 2. The eggs remaining in the holes after the passage of this station are all blown out by means of a nozzle 106 corresponding to the nozzle 50 in FIGS. 1 and 2 and mounted in the side box 104 in some distance from the sorting station 102. Another side box 108 similar to the box 104 may be provided at the other side of the tray so that a sorting will be carried out at each stroke of the rail member 92.

As indicated in dotted lines in FIG. 5 the rail 92 may be made from a flexible material and have the form of an endless belt 93 running over pulleys 110 of which one may be a driving pulley. In this case the extra side box 108 may be avoided since the belt 93 may be moved continuously in one direction so as to bring the eggs out from the tray at one side thereof only. Alternatively, the rejector nozzle 106 may be positioned in the box 108 so as to reject from the holes all eggs remaining therein after the passage of the sorting station 102.

In FIG. 6 there is schematically shown a further modification of the machine. In this embodiment the tray 2 is a simple container with unbroken sides, and the disc 24, 60 is substituted by a smaller disc 120 having a plurality of radial arms 122 mounted thereon, each arm 122 carrying a small bowl member 124 adapted to be moved through the egg mixture in the water, in the tray 2 with the bowl opening in the direction of the movement. The bowl members may have a small hole in the bottom portion so as to allow a certain water flow therethrough during the movement in the water.

When moved through the water the bowl members 124 will each catch one fish egg 126 and bring it along during the further movement past the sorting station 70, where for example the dead eggs are blown away from the bowls in a manner identical with that already described. Thereafter the remaining eggs are moved further to the rejector nozzle 50. If the eggs under the actual circumstances do not stick sufficiently to the bowls to be held therein during the passage down to the rejector nozzle 50, this nozzle may be placed adjacent an earlier stage of the movement path after the sorting station 70. Sprinkler means (not shown) may be provided to wash down all other fish eggs than those supported in the bowl members in case eggs should stick to parts outside the bowl openings.

The sorting station needs not necessarily being located in air, since the photometric registration as well as the rejection of the eggs may well be carried out in water, for example with the use of water jets or mechanically moved, gentle rejection means for pressing the eggs away from the apertures in the sorting station.

We claim:

1. A method of sorting fish eggs of a first and a second character comprising the steps of passing a receiver body provided with a plurality of egg receiving apertures dimensioned for receiving one and only one egg each into a mixture of said eggs in water, bringing eggs into said apertures by a relative water flow thereagainst, moving the part of said receiver body having egg filled receiving apertures from said mixture to a sorting station spaced from said mixture by a movement in a direction relative to the water which is different from the direction of entry of said eggs in said apertures, and removing the eggs of one of said characters from said apertures in said sorting station and collecting the removed eggs in collecting means outside said mixture.

2. A method of separating fish eggs of a first character from a mixture of fish eggs of a first and a second character, comprising the steps of placing a quantity of said egg mixture in water in a container, moving a receiver body having a plurality of egg receiving apertures each dimensioned for receiving one and only one egg into said mixture, providing for a relative movement between said receiver body and the water in said mixture corresponding to a water flow towards said receiving apertures for bringing an egg into each aperture, moving the part of said receiver body having egg filled apertures past a sorting station spaced from said mixture by movement in a direction relative to the water which is different from the direction of entry of said eggs in said apertures, removing from said apertures all eggs of said first character during their passage of said sorting station and collecting them in first collecting means, and moving said receiving body further to a rejector station in which all eggs remaining in the apertures after the passage of said sorting station are removed from the apertures and collected in second collecting means.

3. A machine for sorting out fish eggs of a first character from a mixture of fish eggs of a first and a second character, comprising in combination: means for containing a quantity of said egg mixture in liquid, egg receiving means having a plurality of apertures each dimensioned for receiving one and only one fish egg, at least some of said receiving apertures being submerged in said mixture, means for providing a flow of said liquid towards said apertures to thereby bring an egg into each of a number of said submerged apertures, means for moving said receiving means so as to bring said egg filled apertures from said mixture to a sorting station spaced from said mixture, means operable to test the character of each egg in each aperture in said sorting station and to produce a control signal when testing an egg of said first character, first rejector means operatively connected with said testing means and operable by said control signal to cause said eggs of said first character to be rejected from said apertures for moving them to first collecting means therefor, and second rejector means operable to reject the eggs subsequently remaining in said apertures for moving these eggs to second collecting means.

4. A machine as claimed in claim 3, in which said sorting station is situated in air.

5. A machine for sorting out fish eggs of a first character from a mixture of fish eggs of a first and a second character, comprising in combination: means for containing a quantity of said egg mixture in liquid, endlessly movable conveyor means provided with egg receiving apertures each dimensioned for receiving one and only one egg, driving means for imparting to said conveyor means an endless movement so as to bring said receiving apertures through said mixture and therefrom along a path in the air and back to said mixture, means for providing a flow of liquid through said apertures in the submerged condition thereof to thereby bring an egg into each of a number of said apertures, testing means located in a test station adjacent a point of said movement path and operable to test the character of each egg passing this station in said apertures and to produce a control signal in response to the passage of an egg of said first character, a first rejector mechanism located in a first rejector station and comprising means for rejecting said eggs from said apertures and activator means therefor, said activator means being operatively connected with said testing means and operable in response to said control signal for exposing said tested egg of said first character to said rejector means, and a second rejector mechanism located in a second rejector station at a subsequent stage of the said movement path and operable to reject all eggs remaining in said apertures after passage of said first rejector station.

6. A machine as claimed in claim 5, in which water supply means are located so as to wash down all eggs sticking to said conveyor means outside said apertures.

7. A machine for sorting out fish eggs of a first character from a mixture of fish eggs of a first and a second character, comprising in combination: a container for a quantity of said egg mixture in liquid, a support mounted above said container, an electric motor mounted on said support, a rotatable disc driven by said motor and having a lower part thereof submerged in the mixture in said container, said lower part constituting a wall portion of said container, said disc having an annular row of holes of a diameter slightly bigger than that of the fish eggs to be sorted, external cover means rigidly connected with said container and covering a part of the front opening of said holes along the said lower part of said disc, means for supplying water to said container, testing means mounted on said support and operable to produce a control signal in response to the passage of an egg of said first character in one of said apertures, first rejector means operable by said control signal to cause the said egg to be rejected from its aperture, and a rejector station situated adjacent the movement path of said apertures after said first rejector means when seen in the direction of movement and having continuously operating rejector means operable to reject all eggs remaining in their apertures after having passed said first rejector means.

8. A machine as claimed in claim 7, in which said rejector means are constituted by blower nozzles directed against the path of movement of said apertures, blower means driven by said motor being provides for supplying air to said nozzles.

References Cited by the Examiner

UNITED STATES PATENTS 2,152,758   4/1939   Cox _____ 209—111.6
3,058,588   10/1962  Palmquist _____ 209—111.7 X M. HENSON WOOD, Jr., *Primary Examiner.*

R. A. SCHACHER, *Assistant Examiner.*